Feb. 18, 1969
C. L. LODJIC ET AL
3,428,154
AUTOMATIC BRAKE SLACK ADJUSTER
Filed Oct. 23, 1967
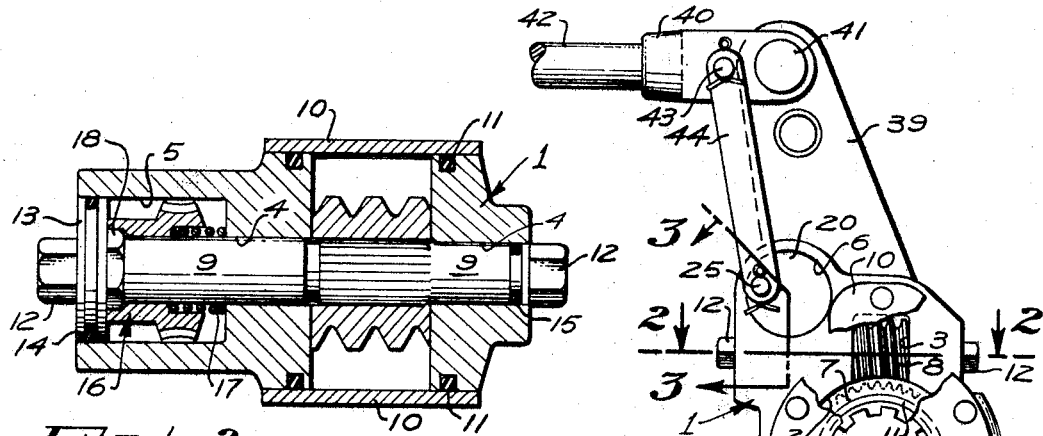
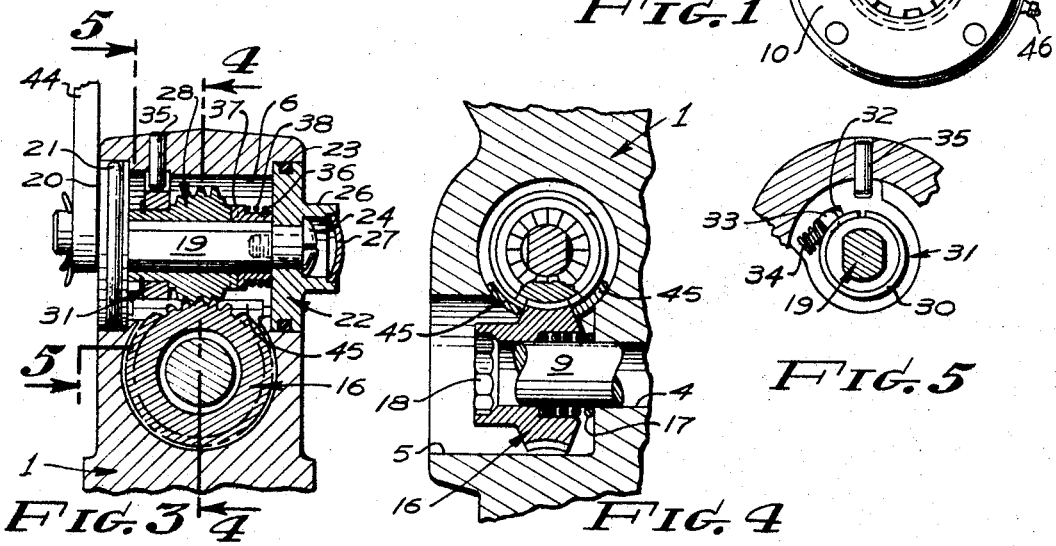
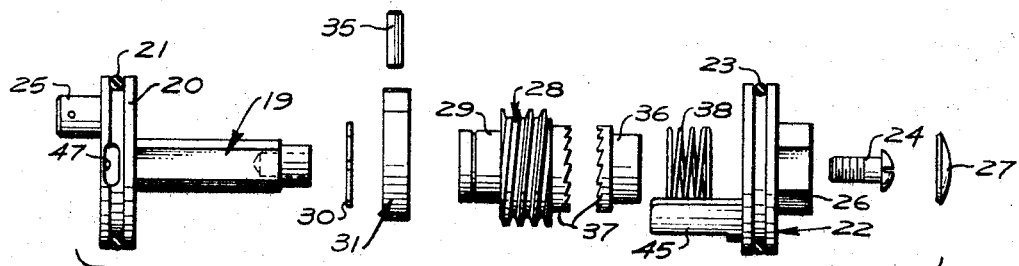
CARL L. LODJIC
DONALD T. McGREGOR
INVENTORS
BY *Lyon & Lyon*
ATTORNEYS United States Patent Office 3,428,154
Patented Feb. 18, 1969

3,428,154
AUTOMATIC BRAKE SLACK ADJUSTER
Carl L. Lodjic, Long Beach, and Donald T. McGregor, La Crescenta, Calif., assignors to Carlodge Corporation, Torrance, Calif., a corporation of California
Filed Oct. 23, 1967, Ser. No. 677,182
U.S. Cl. 188—196                               4 Claims
Int. Cl. F16d 65/38, 51/00

ABSTRACT OF THE DISCLOSURE

A brake adjuster contained in a housing and lever arm interposed between a brake operating shaft and an actuating rod and containing an initial and a final worm and worm gear unit tandem connected through a clutch. The initial unit is contained in part within a bore closed by end seals, one of which is provided with a crank pin linked to the actuating rod, the end seals being interchangeable so that the actuator may be located on the right or left side of a vehicle. The other of the end seals is provided with fingers which operate to disengage the unit connecting clutch to permit relative adjustment of the units. The initial unit is provided with an overriding clutch to lock the adjustment of the adjuster should its connection with the actuating rod fail.

Background of the invention

The following patents and application pertaining to automatic brake adjusters share common ownership: No. 3,314,508, McGregor, D. T., et al.; No. 3,301,354, McGregor, D. T.; No. 3,177,983, McGregor, D. T.; No. 2,835,354, MacDougall, K. B.; No. 2,752,009, MacDougall, K. B.; No. 2,743,793, MacDougall, K. B.; No. 2,648,996, MacDougall, K. B.; No. 2,481,319, MacDougall, K. B.; and application Ser. No. 623,504, Lodjic, C. J., et al.

All of these patents seek to provide automatic brake adjustment and all succeed, at least to some extent. In some cases, the adjustment increment is too large so that the brake pedal or the air brake applicator movement varies substantially. The problems of installation and maintenance have been such that continuous successful operation has depended too much on the skill of the servicemen. At the time of installation, or when the brake lining is replaced, readjustment of the adjuster has been too complicated. Brake adjusters are exposed to the underlying roadway and to rocks and other flying objects which might damage the operating linkage. In the prior art patents, should this happen, the brakes tend to loosen.

Summary of the invention

The present invention seeks to overcome the disadvantages found in previous automatic brake adjusters such as the types shown in the above identified patents, and accordingly, the objects of this invention are:

First, to provide an automatic brake adjuster which incorporates in tandem two worm and worm gear units and a clutch therebetween which is externally accessible for disengagement so that the units may be readily adjusted with respect to each other for initial installation and in conjunction with replacement of the brake lining.

Second, to provide an automatic brake adjuster of the type indicated in the first object which is readily assembled without substitution of parts to operate a brake at the right or left side of a vehicle.

Third, to provide an automatic brake adjuster which incorporates a novel overriding clutch operable as a safety device to prevent the brake from loosening should the adjustment advancing linkage fail.

Description of figures

FIGURE 1 is a side view of the brake slack adjuster.
FIGURE 2 is an enlarged sectional view thereof, taken through 2—2 of FIGURE 1.
FIGURE 3 is an enlarged fragmentary sectional view, taken through 3—3 of FIGURE 1.
FIGURE 4 is a fragmentary sectional view, taken through 4—4 of FIGURE 3.
FIGURE 5 is a fragmentary sectional view, taken through 5—5 of FIGURE 3.
FIGURE 6 is an exploded view, particularly showing the parts illustrated in FIGURE 3.

Specification

The automatic brake slack adjuster includes a body 1, having a hub portion which defines a worm gear chamber 2, intersected at one side by a worm slot 3. The worm slot is penetrated by a worm shaft bore 4, having a counter bore 5 at one end, which intersects a cross bore 6.

The chamber 2 receives a final worm gear 7, which is internally splined for connection to a conventional brake operating shaft, not shown. The slot 3 receives a final worm 8, which engages the worm gear 7, and which is mounted on a shaft 9 journalled in the bore 4. Cover plates 10, having central openings for the brake adjusting shaft, fit over opposite sides of the final worm gear 7 and cover the worm slot 3. The axial sides of the final worm gear 7, which confront the plates 10, are provided with seal rings 11.

The worm shaft 9 protrudes from the ends of the bore 4 and are polygonally shaped, as indicated by 12, to receive a wrench or similiar tool. Secured to the worm shaft 9 and fitted in the outer end of the counter bore 5, is a seal disk 13, having an O-ring seal 14. A corresponding O-ring seal 15 is provided adjacent the opposite end of the worm shaft.

Slidably mounted on the worm shaft within the counter bore 5, is an initial worm gear 16. The gear 16 is urged toward the seal disk 13 by a spring 17. Adjacent the disk 13, the shaft 9 forms a polygonally shaped portion and internally the confronting portion of the worm gear 16 is polygonally shaped to form a clutch 18. It has been found satisfactory to form a six-sided polygon on the shaft and to form internally on the gear, a twelve-sided polygon, so that the gear has twelve positions of adjustment with respect to the shaft. A greater or lesser number of adjustments may be provided as desired.

The cross bore 6 receives a counter shaft 19 on which is fixed a seal disk 20, having an O-ring 21. The other end of the counter shaft, rotatably receives a seal disk 22, having an O-ring 23. The seal disk 22 is held in place by a screw 24.

The seal disk 20 is provided with a crank pin 25, whereas the seal disk 22 is provided with a polygonal boss 26, to receive a wrench or similar tool. The screw 24 is recessed in the boss 26 and a Welsh plug 27 closes the recess.

Slidably and rotatably mounted on the counter shaft 19 is an initial worm 28, from one side of which extends a sleeve 29. Mounted on the sleeve, and held by a retainer ring 30, is a clutch ring 31, having a clutch notch 32. The clutch notch tapers in one direction toward the sleeve 29 and receives a clutch roller 33, backed by a spring 34, so that the initial worm 28 may move in only one direction with respect to the clutch ring. An anchor pin 35 extends radially through the wall of the counter bore 5, and into the clutch ring 31.

Also mounted on the counter shaft 19 is a ratchet sleeve 36. The counter shaft has two flattened sides and the ratchet sleeve has a corresponding configuration so that the ratchet sleeve is slidable, but not rotatable with respect to the counter shaft. The confronting ends of the initial worm 28 and the ratchet sleeve 36 are provided with mutually engaging ratchet teeth which form a ratchet clutch 37. A spring 38 urges the teeth of the clutch in mutual engagement. The clutch teeth are profiled so that the worm 28 and the sleeve 36 may move relatively in one direction but not the other.

Extending from the body 1 is a lever arm 39, to which is attached a clevis 40, by means of a pivot pin 41. The clevis in turn in connected to an actuating rod 42, so that the arm 39 and body 1 are moved arcuately to turn the brake operating shaft, so as to apply or release the corresponding brake. Extending from the clevis 40 is a journal pin 43 which is connected to the crank pin 25 by a link 44.

A pair of fingers 45 of arcuate cross section extend from the seal disk 22 along the wall of the counter bore 5 and straddle the initial worm gear 16. If the seal disk 22 is forcibly turned in one direction, the fingers cause the worm gear 16 to move axially on the worm shaft 9 against the action of the spring 17, so that the clutch 18 is disengaged.

Operation of the automatic brake slack adjuster is as follows:

With each application of the brake connected to the actuator counter shaft 19, the counter shaft is oscillated. When the brake wears slightly, the oscillation will be sufficient to advance the ratchet clutch 37 one tooth, and advance the initial worm 28 through a corresponding arc. The initial worm 28 will advance the initial worm gear 16 a lesser amount, depending upon the gear reduction ratio. Rotation of the worm gear 16 turns the shaft 9 and the final worm 8 a like amount and the final worm gear 7 a lesser amount, depending on the gear ratio between the worm 8 and the worm gear 7. The takeup, thus accomplished, compensates for the slight wear of the brake which caused the ratchet clutch 37 to advance one tooth. The amount of excess movement required to effect this slight adjustment would not be detected by the vehicle driver if the brake pedal were connected mechanically or hydraulically to the actuating rod 42. If, as is usually the practice, an air actuating system is interposed, the compensating adjustment proceeds without change in the operation by the driver.

The vehicle brakes and the mechanism which operates the brakes, including the automatic adjuster, are located under the chassis and are exposed to flying rocks and other objects particularly when the vehicle is used on unpaved roads or temporary dirt roads. Thus, there is always the danger that the link 44 may fail. Should this occur, the overriding clutch, represented by the clutch ring 31, prevents any back movement due to the vibration of the vehicle or other cause that would result in loosening of he brakes.

When the adjuster is initially installed, and whenever readjustment is required, incidental to the installation of new brakes, it is necessary to disengage the final worm and worm gear unit from the initial worm and worm gear unit. This is best effected by disengaging the initial worm gear from the worm shaft 9. Heretofore, this has required a partial disassembly of the adjuster. In the present instance, it is merely necessary to apply a wrench to the boss 26 so as to turn the disk 22 in a direction to cause the fingers 45 to move the worm gear 16 along the worm shaft against the force of the spring 17, thus disengaging the clutch 18. When the proper manual adjustment has been made, the disk 22 is released and the spring 17 causes the clutch 18 to re-engage.

Inasmuch as the actuator is connected to a single corresponding brake, it is necessary to mount the actuators on the right and left sides of the vehicle. In order that the same actuator may be used in either location, the counter shaft 19 may be inserted in either direction into the counter bore 5. In doing this, the positions of the seal disks 20 and 22 are reversed; however, the retainer ring 30, clutch ring 31 and ratchet sleeve 36 remain in the same position. The fingers 45 engage the initial worm gear 16, irrespective of which end of the counter bore the seal disk 22 may be located.

In order that the moving parts of the adjuster be properly lubricated, a suitable grease fitting 46 is provided, preferably communicating with the worm gear chamber 2. One of the seal disks, 20 or 22, preferably the seal disk 20, is provided with a notch 47 at the outer side of the groove which receives the O-ring 21. As a consequence, excess grease may be forced outwardly past the O-ring 21, but the O-ring forms a complete seal against transfer of fluid in the opposite direction or into the counter bore 5.

While particular embodiments of this invention have been shown and described, it is not intended to limit the same to the details of the constructions set forth, but instead, the invention embraces such changes, modifications and equivalents of the various parts and their relationships.

We claim:

1. In an automatic slack adjuster for vehicle brakes wherein the adjuster is housed within a lever interposed between a brake shaft and an operaitng rod, and wherein the adjuster is provided with an initial worm and worm gear unit housed in a cylindrical bore, and a final worm and worm gear unit arranged in tandem and operatively connecting said operating rod and brake shaft to advance the brake shaft by small increments, the combination of means for disconnecting the initial worm and worm gear from the final worm and worm gear, comprising:

(a) a shaft carrying the worm of the final unit and the worm gear of the initial unit to effect tandem connecting between said units;

(b) a clutch including cooperating elements on said shaft and worm gear disengaged by sliding movement of said worm gear on said shaft;

(c) a spring for holding the clutch engaged;

(d) and externally accessible manually operable means including a disk closing an end of said cylindrical bore and a finger extending from said disk into engagement with the worm gear of said initial unit, thereby to disengage said clutch and permit adjustment of said final worm and worm gear unit with respect to said initial worm and worm gear unit.

2. An automatic brake adjuster adapted to be interposed between a brake operating shaft and an actuating rod, said brake adjuster comprising:

(a) an initial movement reducing drive unit including a link connected to said actuating rod;

(b) a final movement reducing drive unit connected to said brake operating shaft;

(c) a connecting shaft interposed between said initial and final units;

(d) a body member defining cavities to receive said initial and final units and said brake operating shaft, and a lever arm connected to said actuating rod at a point different from the connection with said initial unit, whereby oscillation of said shaft and arcuate movement of said adjuster causes said brake operating shaft to advance in small increments;

(e) a clutch interposed in the drive between said link and said brake operating shaft and movable between a disengaged position to permit movement of said brake operating shaft independently of said link, and an engaged position causing advance of said brake operating shaft;

(f) manual means accessible from the exterior of said body for operating said clutch;

(g) and means operable, in the event of failure of said link, to secure said initial drive unit against release of said actuating rod.

3. An automatic brake adjuster adapted to be interposed between a brake operating shaft and an actuating rod, said brake adjuster comprising:

(a) an initial movement reducing drive unit including a link connected to said actuating rod;
(b) a final movement reducing drive unit connected to said brake operating shaft;
(c) a connecting shaft interposed between said initial and final units;
(d) a body member defining cavities to receive said initial and final units and said brake operating shaft, and a lever arm connected to said actuating rod at a point different from the connection with said initial unit, whereby oscillation of said shaft and arcuate movement of said adjuster causes said brake operating shaft to advance in small increments;
(e) a clutch interposed in the drive between said link and said brake operating shaft and movable between a disengaged position to permit movement of said brake operating shaft independently of said link, and an engaged position causing advance of said brake operating shaft;
(f) manual means accessible from the exterior of said body for operating said clutch;
(g) the cavity in said body member which receives a portion of said initial unit being essentially cylindrical and open at each end;
(h) said initial drive unit further including similar seal disks closing the ends of said cylindrical cavity, and said initial drive unit insertable ether end first into said cavity, thereby to permit placement of said adjuster at either side of a vehicle.

4. An adjuster, as defined in claim 3, wherein:
(a) one of said seal disks includes a finger engageable with said clutch thereby forming said manual clutch operating means.

References Cited
UNITED STATES PATENTS

| | | | |
|---|---|---|---|
| 3,301,354 | 1/1967 | McGregor | 188—79.5 X |
| 3,361,230 | 1/1968 | Hildebrand et al. | 188—79.5 |

DUANE A. REGER, *Primary Examiner.*

U.S. Cl. X.R.

188—79.5